April 20, 1926.
S. LIEN
1,581,275
POWER TRANSMITTING ATTACHMENT FOR TRACTORS
Filed Oct. 16, 1924    2 Sheets-Sheet 1
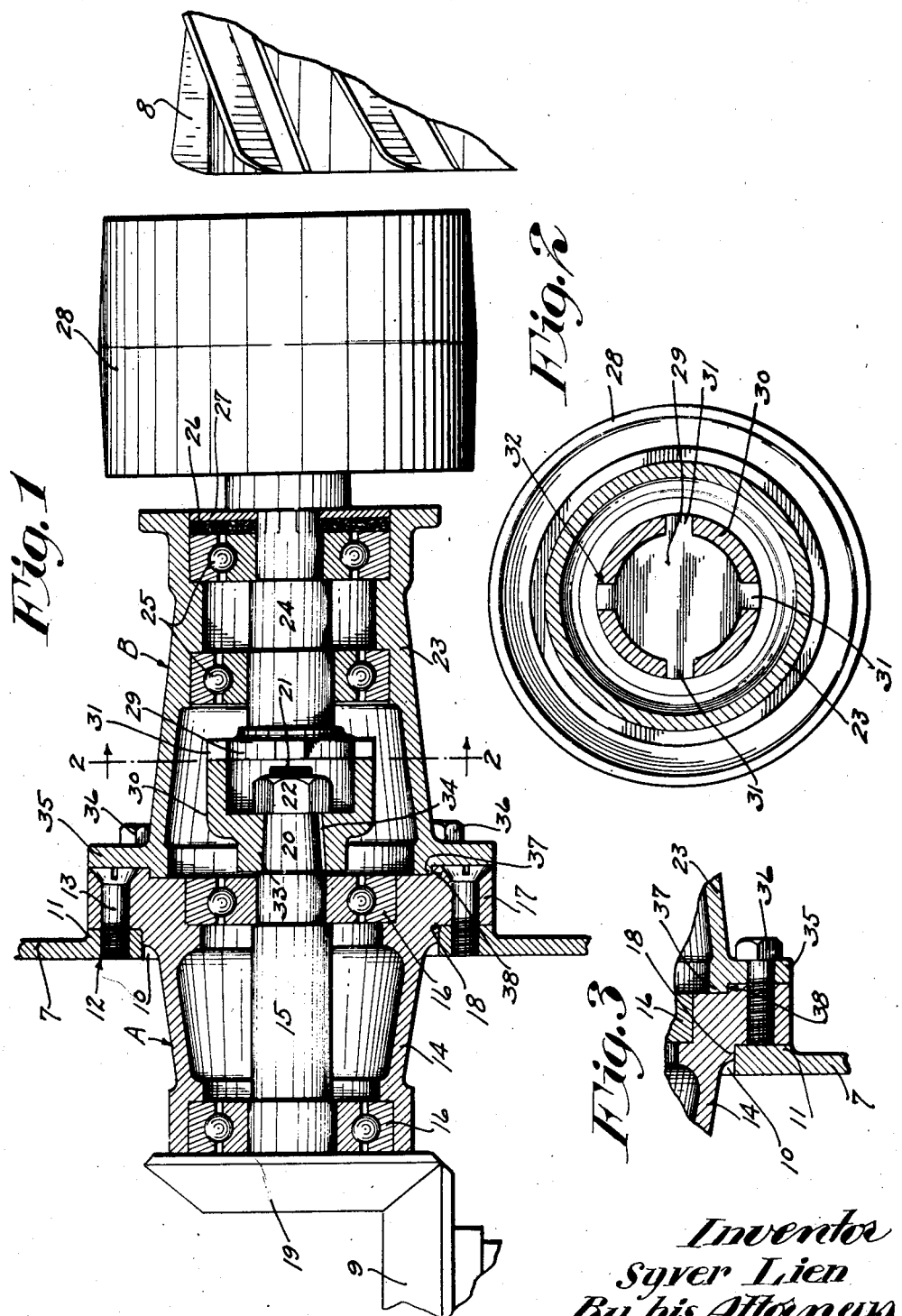
Inventor
Syver Lien
By his Attorneys
Merchant and Kilgore

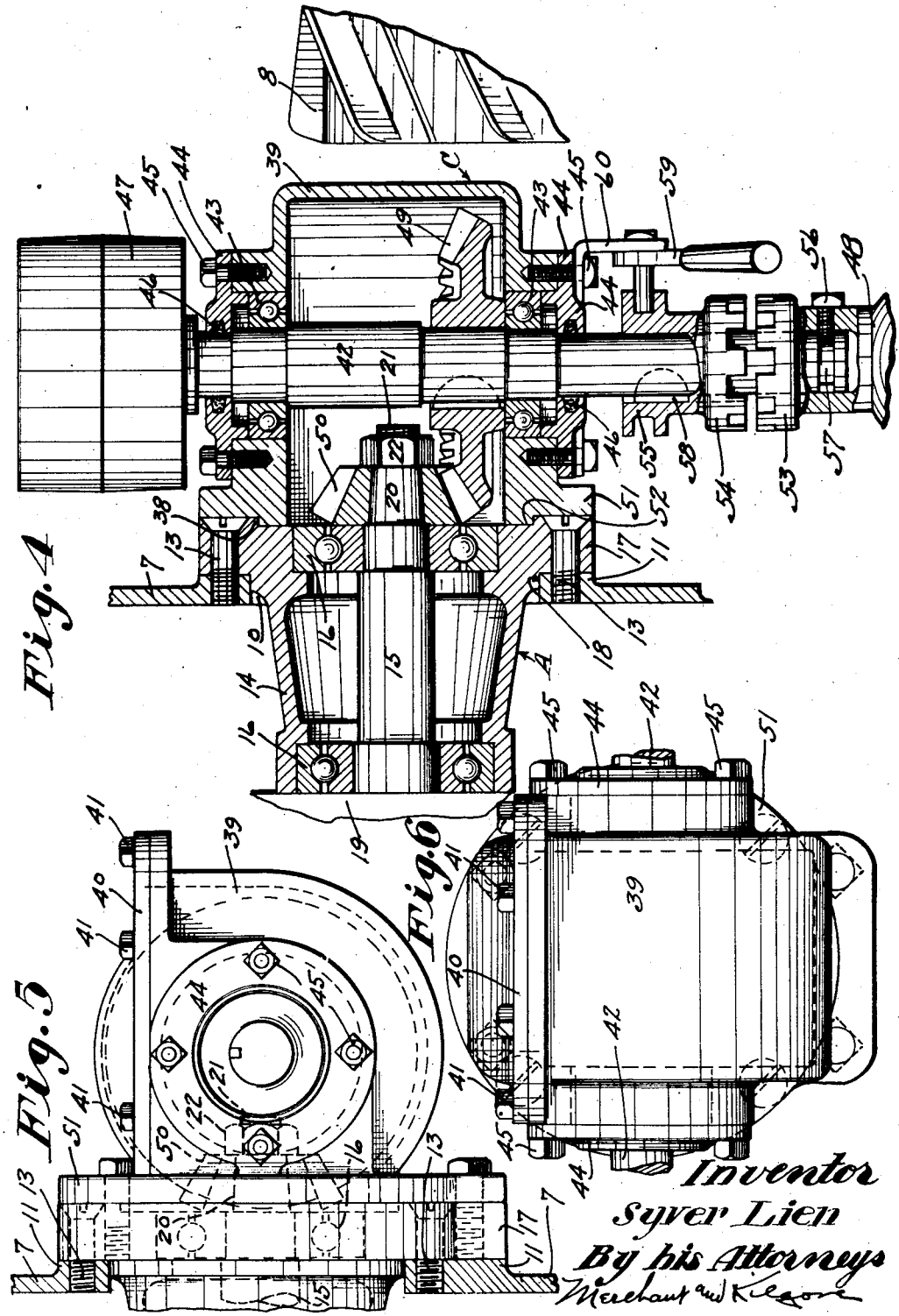

Patented Apr. 20, 1926.

1,581,275

UNITED STATES PATENT OFFICE.

SYVER LIEN, OF COMFREY, MINNESOTA.

POWER-TRANSMITTING ATTACHMENT FOR TRACTORS.

Application filed October 16, 1924. Serial No. 743,963.

*To all whom it may concern:*

Be it known that I, SYVER LIEN, a citizen of the United States, residing at Comfrey, in the county of Brown and State of Minnesota, have invented certain new and useful Improvements in Power-Transmitting Attachments for Tractors; and I do hereby declare the following to be a full, clear, and exact description of the invention, such as will enable others skilled in the art to which it appertains to make and use the same.

My invention has for its object to provide a power transmitting attachment for tractors, and to this end it consists of the novel devices and combinations of devices hereinafter described and defined in the claims.

A commercial Fordson tractor has, as a part of its standard equipment, a belt pulley attachment intended for use when the tractor is to be used as a stationary engine and to be removed when the tractor is to be used as a traction vehicle. Such an attachment includes a pulley housing having journaled therein a shaft equipped at its outer end with a pulley and at its inner end a bevel gear adapted to mesh with the transmission shaft bevel gear of the tractor to drive said pulley. This attachment is designed to have its pulley housing, inner portion of its shaft and attached beveled gear inserted transversely into the transmission housing of the tractor through an opening in the right side thereof normally closed by a foot bracket which, of course, must be removed before the attachment can be applied. This foot bracket has a flange which overlaps an outer flat boss which surrounds the opening in the transmission housing and in which flange is a plurality of circumferentially spaced holes through which extend machine screws that have screw-threaded engagement with said boss and detachably secure the foot bracket to the transmission housing. The pulley housing of the attachment has, at its outer end, a flange with holes which correspond to the holes in the flange of the foot bracket whereby said attachment may be secured to the transmission housing with the same machine screws used in securing the foot bracket thereto. The opening in the transmission housing, normally closed by the foot bracket, is, as previously stated, on the right side of the transmission housing and so located that the rear right traction wheel overlaps the same and, as the length of the belt pulley attachment is materially greater than the distance between said housing and wheel, it is necessary in order to insert the attachment endwise into the hole to jack up the tractor and remove the wheel. It will thus be seen that in applying the attachment to a tractor and removing the same therefrom, necessitates an unusually large amount of work.

One of the primary objects of the invention is to provide for a commercial tractor, having the same general characteristics as a Fordson tractor, a power-transmitting attachment which may be used to drive the mechanism of a machine such as a corn picker, harvester or the like, while the tractor is operating as a traction vehicle. Said invention also provides such an attachment from which a machine or other device may be operated when positioned in front of the tractor, back of the tractor or at one side thereof, and while the tractor is used either as a traction vehicle or a stationary engine. My attachment may also be applied to such a tractor or removed therefrom without removing one of the wheels, and a belt or tumbling rod may be driven therefrom.

In the accompanying drawings, which illustrate the invention, like characters indicate like parts throughout the several views.

Referring to the drawings:

Fig. 1 is a view principally in central section illustrating one adjustment of the invention;

Fig. 2 is a view taken in transverse section on the line 2—2 of Fig. 1;

Fig. 3 is a detail view in section showing the means for attaching the outer housing sections to the inner housing section;

Fig. 4 is a view corresponding to Fig. 1 but showing another adjustment of the invention;

Fig. 5 is a rear elevation of the parts shown in Fig. 4; and

Fig. 6 is a side elevation of the same.

In the drawings the invention is applied to a tractor having the same characteristics as a Fordson tractor, and the fragmentary illustrated parts thereof include the right side of the transmission housing 7, rear right traction wheel 8 and transmission shaft bevel gear 9 which is provided to drive the belt pulley attachment heretofore referred to. The right side of the transmission housing 7 has an opening 10 normally closed by a foot bracket, not shown, and in which opening may be mounted the belt pulley attachment which is part of the standard equipment of the tractor and to apply this attachment, as previously stated, it is necessary to remove the right wheel 8 in order to insert the attachment endwise through the opening 10 to cause its bevel gear to mesh with the bevel gear 9. The transmission housing 7 at the opening 10 has an outstanding flat boss 11 in which is formed a plurality of screw-threaded holes 12 in which are mounted screw bolts 13 provided for securing the foot bracket, not shown, to said housing.

The invention as illustrated comprises a permanent assembly A and removable assemblies B and C which are interchangeably usable with the assembly A. Said assembly A includes a cast open ended housing section 14 through which projects an inner shaft section 15 journaled in ball bearings 16 in the open ends of said housing. On the outer end of the housing section 14 is an annular flange 17 which overlaps the boss 11 and is permanently secured to the transmission housing 7 by the screws 13 which project through countersunk holes in said flange. Inward of the flange 17, the housing section 14 is provided with an annular shoulder 18 which is telescoped into the opening 10 and securely holds said housing properly aligned and against lateral movement. It may be here stated that there is sufficient clearance between the transmission housing 7 and wheel 8 to insert the housing section 14 through the opening 10 and secure the same in position by the screw bolts 13. On the inner end of the shaft section 15 is a bevel gear 19 which meshes with the bevel gear 9 and drives said shaft section 15 therefrom. Said shaft section 15, outward of the housing 14, has a tapered outer end 20 and a screw-threaded reduced stud 21 to which is applied a nut 22.

The assembly B comprises an open ended case housing section 23 through which projects an outer shaft section 24 axially aligned with the shaft section 15 and which shaft section 24 is journaled in front and rear ball bearings 25. Outward of the outer bearing 25 is a felt oil retainer 26 held in position by a cover plate 27. Keyed to the outer end of the outer shaft section 24 is a pulley 28. On the inner end of the outer shaft section 24 is a separable coupling comprising a disc-like member 29 and a cup-like member 30, the former of which is permanently secured to the outer shaft section 24 and has a plurality of radial lugs 31 mounted in notch-like seats 32 formed in the rim of said cup-like member. The cup-like member 30 has an axial hub 33 that is removably telescoped onto the tapered end 20 of the inner shaft section 15, held for rotation by a key 34 and against axial removal from said tapered end by the nut 22.

Formed with the inner end of the housing section 23 is an outstanding annular flange 35 which overlaps the flange 17 and is detachably secured thereto by a plurality of machine screws 36. Inward of the flange 35 the outer shaft section 15 is provided with a short extension 37 which telescopes into a shallow recess 38 in the outer face of the flange 17 and securely holds said housing section in its proper relation with the housing section 18 so that the outer shaft section 24 is in axial alignment with the inner shaft section 15. In attaching the assembly B to the assembly A the separable coupling member 30 is first secured to the inner shaft section 15 and then the outer housing section 23 is secured to the housing section 14 by the machine screw 36 after the assembly has been moved axially endwise to cause the separable coupling member 29 to interlock with the separable coupling member 30 and to telescope the extension 37 into the recess 38. Obviously, this axial movement of the assembly B is very slight and the distance between the wheel 8 and the flange 17 is sufficient to permit this movement of the assembly B.

The assembly C includes a cast housing section 39 the inner side of which is open, as well as the top and which top is normally closed by a cover plate 40 held in position by machine screws 41. An outer shaft section 42 extends completely through the housing section 39 from the front to the rear thereof and at right angles to the inner shaft section 15. This outer shaft section 42 is journaled in roller bearings 43 mounted in the front and back of the housing section 39 and the openings in the front and back of the housing section 39 are normally closed by cover plates 44 held in position by machine screws 45 and having felt oil retainers 46. Keyed to one of the projecting ends of the outer shaft section 42 is a pulley 47 and to the other projecting end thereof is attached a tumbling rod 48. Keyed to the outer shaft section 42 within the housing section 39 is a bevel gear 49 which meshes with a bevel pinion 50 secured on the tapered end 20 of the inner shaft section 15 by the nut 22 and key 34 in place of the separable connection member 30.

The housing section 39, at its inner end, has formed therewith an annular outstanding flange 51 detachably secured to the flange 17 by the machine screws 36. The housing section 39 is also provided at its inner end with a short extension 52 which is telescoped into the recess 38 and holds the housing section 39 in its proper position in respect to the housing section 14. By means of this assembly C a machine or other device may be driven from the pulley 47 when positioned at one side of the tractor. Or a machine or device positioned either forward or backward of the tractor may be operated by means of the tumbling rod 48. It should be here stated that the shaft 42 may be removed form the housing section 39 and its gear 49 removed therefrom, turned end for end, and again replaced in the housing section 39 and the gear 49 again secured thereto. It will thus be seen that the direction of rotation of the outer shaft section 42 may be reversed and the tumbling rod 48 positioned to extend either forward or rearward of the tractor. This assembly C, like assembly B, requires only a slight axial movement during its application to the assembly A or its removal therefrom.

To prevent the tumbling rod 48 from operating while the tractor is drawing a corn picker, or other machine operated by the tumbling rod, to and from work or while turning in the field, said tumbling rod is loosely journaled on the shaft 42 and has formed therewith a half clutch 53 arranged for co-operation with a half clutch 54 formed with the hub of a shipper collar 55 on the shaft 42. Said tumbling rod 48 is held against axial movement on the shaft 42 by a set screw 56 which extends into a circumferential channel 57 in the shaft 42 but permits free rotation of said shaft in the tumbling rod 48. The shipper collar 55 is secured to the shaft 42 for rotation therewith by a key 58 arranged to permit free sliding movement of said collar. The shipper collar 55 is moved on the shaft 42 to slide the half clutch 54 into and out of engagement with the half clutch 53 by a shipper lever 59 mounted on a bracket 60 secured to the respective cover plate 44 by the attaching screws 45.

The applicant has built and used one of the power-transmitting attachments and used the same on his Fordson tractor in connection with operating a corn picker, and the same has proven highly efficient for the purpose had in view. By the use of my power-transmitting attachment the same may be used for operating a machine or other device either when the tractor is used as a stationary engine or as a traction vehicle, for drawing the machine or device while operating the mechanism thereof.

What I claim is:

1. A power-transmitting attachment for tractors comprising an inner assembly and an outer assembly, the former of which has an inner shaft section and means for driving the same from a movable part of a tractor and the latter of which includes a housing adapted to be detachably secured to a tractor and an outer shaft section journaled in said housing, said two assemblies also including a pair of separable interlocking members rigidly secured one to each of said shaft sections and loosely and detachably connecting the same whereby one of said members can rotate in wabble arrangement in respect to the other in case said shaft sections are out of alignment, said assemblies being arranged to remain intact when the housing is detached from a tractor.

2. A power-transmitting attachment for tractors comprising an inner assembly and an outer assembly, the former of which has an inner shaft section and means for driving the same from a movable part of a tractor and the latter of which has an outer shaft section on one end of which is a pulley and on the other end of which is a clutch member, said two assemblies also including gearing connecting said two shaft sections.

3. A structure defined in claim 1 in which the gearing in the outer shaft section is reversible to change the direction of rotation of said shaft section.

4. A power-transmitting attachment for tractors comprising an inner assembly and an outer assembly, the former of which has an inner shaft section and means for driving the same from a movable part of a tractor and the latter of which includes a housing and an endwise reversible shaft section mounted in said housing and having on one end a pulley and on its other end a clutch member, said two assemblies also including gearing connecting said two shaft sections.

In testimony whereof I affix my signature.

SYVER LIEN.